US012725228B1

(12) United States Patent
Kang et al.

(10) Patent No.: US 12,725,228 B1
(45) Date of Patent: Sep. 1, 2026

(54) FINGERPRINT RECOGNITION DEVICE AND METHOD, AND METHOD FOR TRAINING ARTIFICIAL NEURAL NETWORK FOR FINGERPRINT IMAGE RESTORATION IN THE FINGERPRINT RECOGNITION DEVICE

(71) Applicant: Suprema Inc., Seongnam-si (KR)

(72) Inventors: Young Mook Kang, Seongnam-si (KR); Ho Chul Shin, Seongnam-si (KR); Jong Man Lee, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 0 days.

(21) Appl. No.: 19/308,886

(22) Filed: Aug. 25, 2025

(30) Foreign Application Priority Data

Jun. 18, 2025 (KR) ........................ 10-2025-0080524

(51) Int. Cl.

*G06T 5/77* (2024.01)
*G06T 5/60* (2024.01)
*G06V 10/75* (2022.01)
*G06V 10/774* (2022.01)
*G06V 10/82* (2022.01)
(Continued)

(52) U.S. Cl.

CPC .................. *G06T 5/60* (2024.01); *G06T 5/77* (2024.01); *G06V 10/774* (2022.01); *G06V 10/82* (2022.01); *G06V 10/993* (2022.01); *G06V 40/1353* (2022.01); *G06V 40/1371* (2022.01); *G06T 2207/20081* (2013.01); *G06T 2207/30168* (2013.01); *G06T 2207/30196* (2013.01); *G06V 10/751* (2022.01)

(58) Field of Classification Search

CPC ............................................ G06V 40/12–1394
See application file for complete search history.

(56) References Cited

U.S. PATENT DOCUMENTS 5,974,163 A * 10/1999 Kamei ................. A61B 5/1172 382/125
11,869,229 B2 1/2024 Naresh
(Continued)

FOREIGN PATENT DOCUMENTS

CN 108960214 A * 12/2018 ............. G06N 3/045
WO WO-2022121858 A1 * 6/2022 ........... G06V 10/774
WO WO-2022236877 A1 * 11/2022 ........... G06F 18/253

*Primary Examiner* — Patrick F Marinelli
(74) *Attorney, Agent, or Firm* — Bridgeway IP Law Group, PLLC; Jihun Kim

(57) ABSTRACT

There is provided a fingerprint recognition device. The device comprises an acquisition unit that acquires an original fingerprint image; a memory including instructions for generating a restored fingerprint image from the original fingerprint image using a pre-trained artificial neural network, the restored fingerprint image having a resolution substantially identical to that of the original fingerprint image; and a processor for executing the instructions to generate the restored fingerprint image having the resolution substantially identical to that of the original fingerprint image and minutiae substantially identical to minutiae in the original fingerprint image, wherein the artificial neural network is pre-trained to generate the restored fingerprint image by reflecting minutiae in a degraded fingerprint image obtained through degrading the original fingerprint image and minutiae in the restored fingerprint image.

20 Claims, 8 Drawing Sheets

(51) Int. Cl.

| | |
|---|---|
| ***G06V 10/98*** | (2022.01) |
| ***G06V 40/12*** | (2022.01) |

(56) References Cited

U.S. PATENT DOCUMENTS

| | | | | |
|---|---|---|---|---|
| 12,175,791 | B2 * | 12/2024 | Di | G06N 3/045 |
| 12,299,851 | B2 * | 5/2025 | Lee | G06T 5/70 |
| 2023/0030937 | A1 * | 2/2023 | Lee | G06T 5/10 |
| 2024/0005695 | A1 * | 1/2024 | Di | G06N 3/08 |
| 2025/0182523 | A1 * | 6/2025 | Kang | G06V 40/1376 |

* cited by examiner

FINGERPRINT RECOGNITION DEVICE AND METHOD, AND METHOD FOR TRAINING ARTIFICIAL NEURAL NETWORK FOR FINGERPRINT IMAGE RESTORATION IN THE FINGERPRINT RECOGNITION DEVICE

CROSS-REFERENCE TO RELATED APPLICATION

This application claims priority from Korean Patent Application No. 10-2025-0080524 filed on Jun. 18, 2025, in the Korean Intellectual Property Office and all the benefits accruing therefrom under 35 U.S.C. 119, the contents of which in its entirety are herein incorporated by reference.

TECHNICAL FIELD

The present disclosure relates to fingerprint recognition technology, and more particularly, to a technique for improving the quality of fingerprint images.

This work was supported by Institute for Information & communications Technology Promotion (IITP) grant funded by the Korea government (MSIT; Ministry of Science and ICT) (No. 2710076766, Development of communication/computing convergence innovation technology for superintelligent services).

BACKGROUND

In general, low-quality fingerprint images cause a decrease in recognition rate in fingerprint recognition system due to various degradation factors (sensor noise, pressure imbalance, poor lighting, etc.).

In addition, when a uniform filter is applied to the entire fingerprint image to improve the fingerprint recognition rate for low-quality fingerprint images, there is a problem in that it fails to reflect regional quality variations in the image. In other words, it may unnecessarily convert high-quality regions in the fingerprint image, while failing in sufficiently improving the recognition rate for low-quality regions, resulting in an imbalance.

In particular, since the fingerprint recognition rate improvement results affect the unique biometric minutiae of a fingerprint, there is a risk of degrading the fingerprint recognition accuracy of the fingerprint recognition system.

In addition, synthesized degraded fingerprint images are mainly used to build training data for artificial neural networks, due to the difficulty of obtaining paired high-quality and low-quality fingerprint images required for supervised learning in actual artificial neural network training environments.

Even if only a single or fixed degradation pattern is applied to training, it fails in sufficiently reflecting various conditions and states of low-quality images that occur in real-world environments.

Therefore, there is a need for technical measures to improve the generalization performance of the trained enhancement model.

SUMMARY

In view of the above, an embodiment of the present disclosure provides a fingerprint recognition technology capable of restoring a randomly acquired fingerprint image into a high-quality fingerprint image.

An embodiment of the present disclosure provides a techniche for training an artificial neural network to restore a high-quality fingerprint image by additionally reflecting minutiae in the fingerprint image along with the fingerprint image.

An embodiment of the present disclosure provides a fingerprint recognition technology capable of degrading an original fingerprint image to use a low-quality fingerprint image for training an artificial neural network, and restoring a fingerprint image having a resolution substantially identical to that of the original fingerprint image from the degraded low-quality fingerprint image.

In accordance with an aspect of the present disclosure, there is provided a fingerprint recognition device, the device comprising: an acquisition unit that acquires an original fingerprint image; a memory including instructions for generating a restored fingerprint image from the original fingerprint image using a pre-trained artificial neural network, the restored fingerprint image having a resolution substantially identical to that of the original fingerprint image; and a processor for executing the instructions to generate the restored fingerprint image having the resolution substantially identical to that of the original fingerprint image and minutiae substantially identical to minutiae in the original fingerprint image, wherein the artificial neural network is pre-trained to generate the restored fingerprint image by reflecting minutiae in a degraded fingerprint image obtained through degrading the original fingerprint image and minutiae in the restored fingerprint image.

The artificial neural network may be pre-trained by reflecting a difference between the minutiae in the degraded fingerprint image and the minutiae in the restored fingerprint image in a loss function.

The artificial neural network may be pre-trained by reflecting a degree of change in at least one of position, angle, and number of a minutiae between the degraded fingerprint image and the restored fingerprint image in the loss function.

The artificial neural network may be pre-trained to generate the restored fingerprint image by inputting the degraded fingerprint image or a pair of the original fingerprint image and the degraded fingerprint image as training data, and by setting the original fingerprint image as label data.

The degraded fingerprint image may include an image obtained through applying a plurality of degradation techniques in a sequential or random manner, estimating a local quality of the degraded fingerprint image, and applying a spatial weight map based on a result of the local quality estimation.

The local quality may include an indicator of the local quality based on ridge clarity and local contrast of the degraded fingerprint image segmented into block units.

The spatial weight map may be obtained through reflecting a result of normalizing the indicator.

The restored fingerprint image may be expressed by the following Equation: $E(x,y)=W(x,y)\cdot O(x,y)+(1-W(x,y))\cdot I(x,y)$, where $W(x,y)$ represents the spatial weight map, $O(x,y)$ represents the restored fingerprint image, and $I(x,y)$ represents the original fingerprint image.

In accordance with another aspect of the present disclosure, there is provided a method for training an artificial neural network for fingerprint image restoration in a fingerprint recognition device, the method comprising: acquiring an original fingerprint image; generating training data including a degraded fingerprint image obtained through degrading the original fingerprint image; and training the artificial neural network to generate a restored fingerprint image from the training data, the restored fingerprint image having a resolution substantially identical to that of the original fingerprint image and minutiae substantially identical to minutiae in the original fingerprint image.

The training the artificial neural network may include: extracting minutiae in the degraded fingerprint image and the minutiae in the restored fingerprint image; and reflecting a difference between the minutiae in the degraded fingerprint image and the minutiae in the restored fingerprint image in a loss function of the artificial neural network.

The reflecting the loss function of the artificial neural network may include: measuring a degree of change in at least one of position, angle, and a number of the minutiae between the degraded fingerprint image and the restored fingerprint image.

The training the artificial neural network may include: training the artificial neural network to generate the restored fingerprint image by inputting the degraded fingerprint image or a pair of the original fingerprint image and the degraded fingerprint image as training data, and by setting the original fingerprint image as label data.

The generating the training data may include: generating the degraded fingerprint image by applying a plurality of degradation techniques to the original fingerprint image in a sequential or random manner; estimating a local quality of the degraded fingerprint image; and generating a spatial weight map of the degraded fingerprint image based on a result of the local quality estimation.

The estimating a local quality of the degraded fingerprint image may include: calculating an indicator of the local quality based on ridge clarity and local contrast of the degraded fingerprint image segmented into block units.

The generating the spatial weight map may include normalizing the indicator.

The training the artificial neural network may include repeatedly training the artificial neural network to minimize the difference between the minutiae in the degraded fingerprint image and the minutiae in the restored fingerprint image, the final restored fingerprint image output through the repeated training is expressed by the following Equation: $E(x,y)=W(x,y)\cdot O(x,y)+(1-W(x,y))\cdot I(x,y)$, where $W(x,y)$ represents the spatial weight map, $O(x,y)$ represents the restored fingerprint image, and $I(x,y)$ represents the original fingerprint image.

In accordance with another aspect of the present disclosure, there is provided a non-transitory computer-readable storage medium storing a computer program including instructions for causing a processor to perform a fingerprint recognition method, the fingerprint recognition method comprising: acquiring an original fingerprint image; and generating a restored fingerprint image using a pre-trained artificial neural network, the restored fingerprint image having a resolution substantially identical to that of the original fingerprint image and minutiae substantially identical to minutiae in the original fingerprint image, wherein the restored fingerprint image reflects minutiae in a degraded fingerprint image obtained through degrading the original fingerprint image and the minutiae in the restored fingerprint image.

The artificial neural network may be pre-trained by reflecting a difference between the minutiae in the degraded fingerprint image and the minutiae in the restored fingerprint image in a loss function.

The artificial neural network may be pre-trained by reflecting a degree of change in at least one of position, angle, and a number of the minutiae between the degraded fingerprint image and the restored fingerprint image in the loss function.

The artificial neural network may be pre-trained to generate the restored fingerprint image by inputting the degraded fingerprint image or a pair of the original fingerprint image and the degraded fingerprint image as training data, and by setting the original fingerprint image as label data.

According to the embodiment of the present disclosure, a low-quality fingerprint image can be restored to a high-quality fingerprint image, and the quality of the entire fingerprint image can be improved in a balanced manner by restoring low-quality regions in the fingerprint image to high quality while maintaining high-quality regions in their original state. In addition, according to the embodiment of the present disclosure, it is possible to obtain a restored fingerprint image in a way that enhances image quality while maintaining the biometric features of the original fingerprint image. As a result, the reliability of the fingerprint recognition device can be improved.

DETAILED DESCRIPTION

Figure 1:
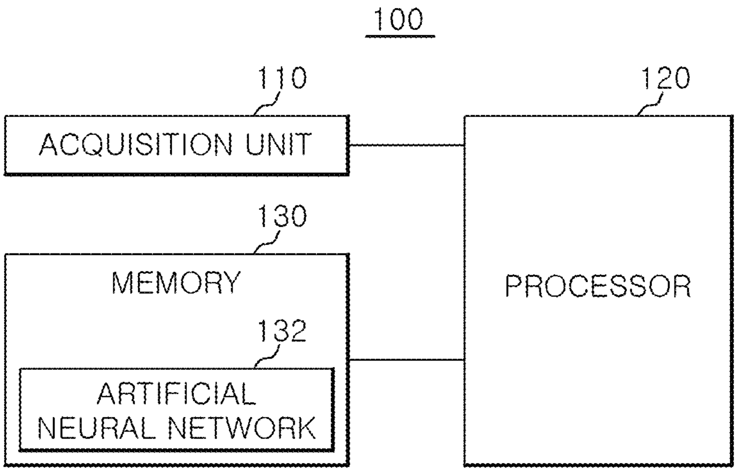
FIG. 1 is a block diagram for explaining the functions of a fingerprint recognition device according to one embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Hereinafter, embodiments of the present disclosure will be described in detail with reference to the attached drawings.

FIG. 1 is a block diagram for explaining the functions of a fingerprint recognition device 100 according to one embodiment of the present disclosure.

The fingerprint recognition device 100 of FIG. 1 is an electronic device installed in a biometric authentication environment where authentication such as fingerprint recognition is required. In an embodiment of the present invention, the electronic device may include, for example, at least one of a smartphone, an e-book reader, a tablet personal computer, a laptop personal computer, a netbook computer, a desktop computer, a server computer, and a wearable device. In another embodiment, the electronic device may include at least one of network security equipment, navigation equipment, marine electronic devices (e.g., marine navigation devices, gyrocompasses), avionics, in-vehicle head units, point-of-sale (POS) systems, and Internet of Things (IoT) devices. In addition, the electronic device may be equipped with an application for performing various fingerprint recognition operations, such as fingerprint acquisition, data processing, and output of fingerprint recognition results. The application may include, for example, a smartphone application, a personal computer (PC) application, a set-top box (STB) application, a web application, or an instant application. However, in implementing the embodiments of the present invention, the application is not limited to any particular type.

As shown in FIG. 1, the fingerprint recognition device 100 according to one embodiment of the present disclosure may include an acquisition unit 110, a processor 120, and a memory 130. The fingerprint recognition device 100 of FIG. 1 may include both a training device that trains a model to generate a restored fingerprint image from a fingerprint image, and an application device that outputs the restored fingerprint image from the fingerprint image using trained data. In the following embodiments, the training device and the application device will be described together.

The acquisition unit 110 can acquire a fingerprint image. When a fingerprint of a contact object (e.g., a human finger) contacts a fingerprint contact surface of the fingerprint recognition device 100, the acquisition unit 110 may receive a fingerprint image within the fingerprint recognition device 100. The acquisition unit 110 may include, for example, an image sensor provided in a fingerprint recognition terminal of an access control system. The image sensor may acquire an image of a fingerprint in contact with the fingerprint contact surface by outputting a digital signal, which is an electrical signal corresponding to an incoming optical signal. The image sensor is an optical fingerprint sensor, and for example, a CCD (charge coupled device) or a CMOS (complementary metal-oxide semiconductor) element may be used. The image sensor serves to detect a fingerprint pattern image generated by light emitted from a light source, and is not limited to a specific type of component. The image sensor according to one embodiment of the present disclosure generates an image by changing an electrical signal value according to the amount of light, and may output a black image in the absence of light, and a white image when the amount of incoming light is the largest.

The processor 120 may execute instructions stored in the memory 130 to generate a restored fingerprint image having a resolution substantially identical to that of the acquired fingerprint image and minutiae substantially identical to minutiae in the acquired fingerprint image. The processor 120 may include, for example, a microprocessor-based processing device, and the specific configuration and functions of the processor 120 will be described in more detail with reference to FIGS. 2 to 4.

The memory 130 may include instructions for restoring a fingerprint image from the acquired fingerprint image using a pre-trained artificial neural network 132, such that the restored fingerprint image has a resolution substantially identical to that of the acquired fingerprint image. The memory 130 may include, for example, a memory such as RAM (random access memory), ROM (read only memory), or the like, and a storage medium such as a local disc or storage connected through a network. In implementing the embodiment of the present disclosure, the memory 130 is not limited to any specific type of storage medium.

In this case, the artificial neural network 132 in the memory 130 may be pre-trained to generate a restored fingerprint image by reflecting minutiae in a degraded fingerprint image obtained through degrading the original fingerprint image and minutiae in the restored fingerprint image, and may be pre-trained by reflecting the difference between the minutiae in the degraded fingerprint image and the minutiae in the restored fingerprint image in a loss function. The artificial neural network 132 may include, for example, a deep learning-based network, and may be included in a fingerprint recognition program executed by the processor 120. Accordingly, the processor 120 may extract minutiae from the acquired fingerprint image and, by executing instructions, process the image to generate a restored fingerprint image that has a resolution substantially identical to that of the original fingerprint image and contains minutiae substantially identical to those in the original fingerprint image.

Figure 2:
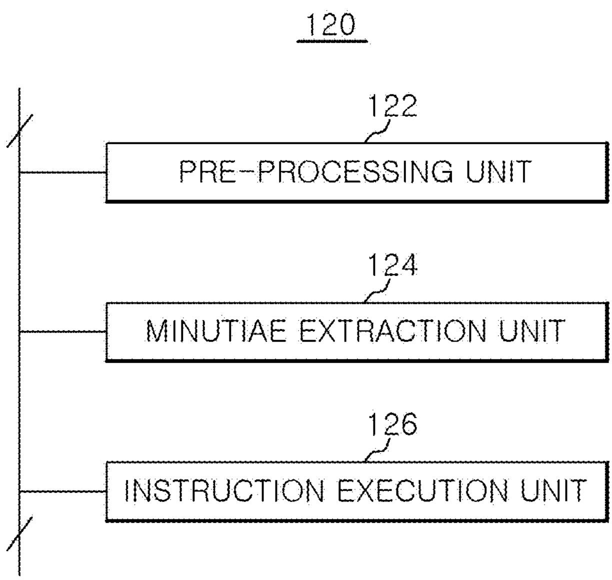
FIG. 2 is a block diagram for explaining the detailed functions of a processor in the fingerprint recognition device of FIG. 1.

FIG. 2 is a block diagram for explaining the detailed functions of the processor 120 in the fingerprint recognition device 100 of FIG. 1. In the following description, for convenience, the original fingerprint image will be referred to as A, the minutiae of the original fingerprint image as B, the degraded fingerprint image as a, the minutiae of the degraded fingerprint image as b, the restored fingerprint image as A', and the minutiae of the restored fingerprint image as B'.

As shown in FIG. 2, the processor 120 may include a pre-processing unit 122, a minutiae extraction unit 124, and an instruction execution unit 126.

The pre-processing unit 122 may serve to generate training data for training the artificial neural network 132. The training data may include a degraded fingerprint image a obtained through degrading the original fingerprint image A, and the degraded fingerprint image a may be an image obtained through reflecting pre-processing steps such as region segmentation, local quality estimation, normalization, and spatial weight map generation.

The minutiae extraction unit 124 may extract the minutiae B of the original fingerprint image A and extract the minutiae b for the training data generated by the pre-processing unit 122, i.e., the degraded fingerprint image a. In addition, the minutiae extraction unit 124 may extract the minutiae B' for the restored fingerprint image A', which is the trained result in the artificial neural network 132. In this case, the minutiae includes feature information of the fingerprint image, and may include, for example, information on the ridges and valleys of the fingerprint.

The instruction execution unit 126 may execute instructions stored in the memory 130 to train the artificial neural network 132 to generate a restored fingerprint image A' that has a resolution substantially identical to that of the original fingerprint image A and minutiae B' substantially identical to the minutiae B in the original fingerprint image A.

Figure 3:
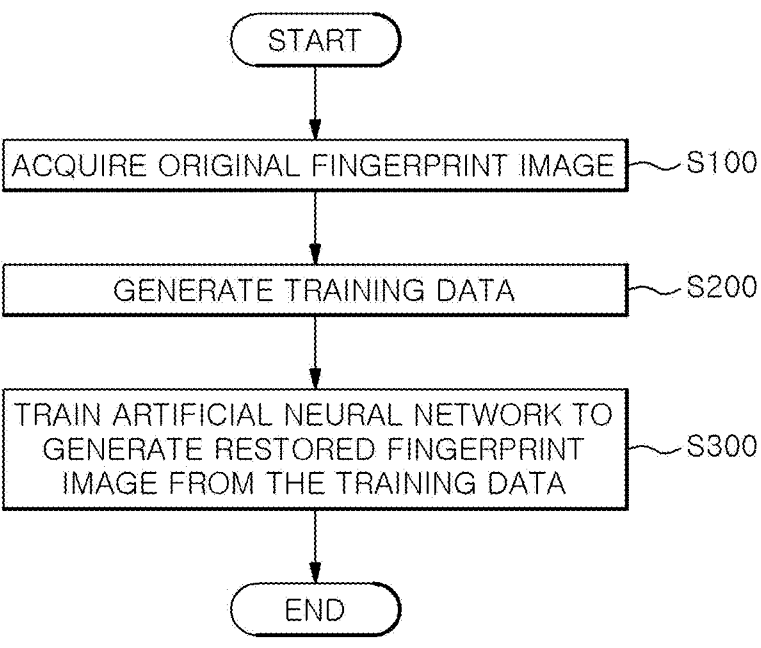
FIG. 3 is a flowchart illustrating a method for training an artificial neural network for fingerprint image restoration in the fingerprint recognition device according to one embodiment of the present disclosure.

FIG. 3 is a flowchart for explaining a method for training the artificial neural network 132 for fingerprint image restoration in the fingerprint recognition device 100 according to one embodiment of the present disclosure.

As shown in FIG. 3, the fingerprint recognition device 100 may acquire an original fingerprint image A through the acquisition unit 110 (S100).

Thereafter, the fingerprint recognition device 100 may generate training data from the acquired original fingerprint image A (S200). The training data may include a degraded fingerprint image a, and the degraded fingerprint image a may include an image obtained through reflecting the pre-processing steps in FIG. 4, which will be described later. Alternatively, the training data may include a pair of the original fingerprint image A and the degraded fingerprint image a.

Once the training data is generated, the fingerprint recognition device 100 may train the artificial neural network 132 to generate a restored fingerprint image A' from the training data (S300). The specific process of training the artificial neural network 132 will be described later with reference to FIGS. 6 and 7.

Figure 4:
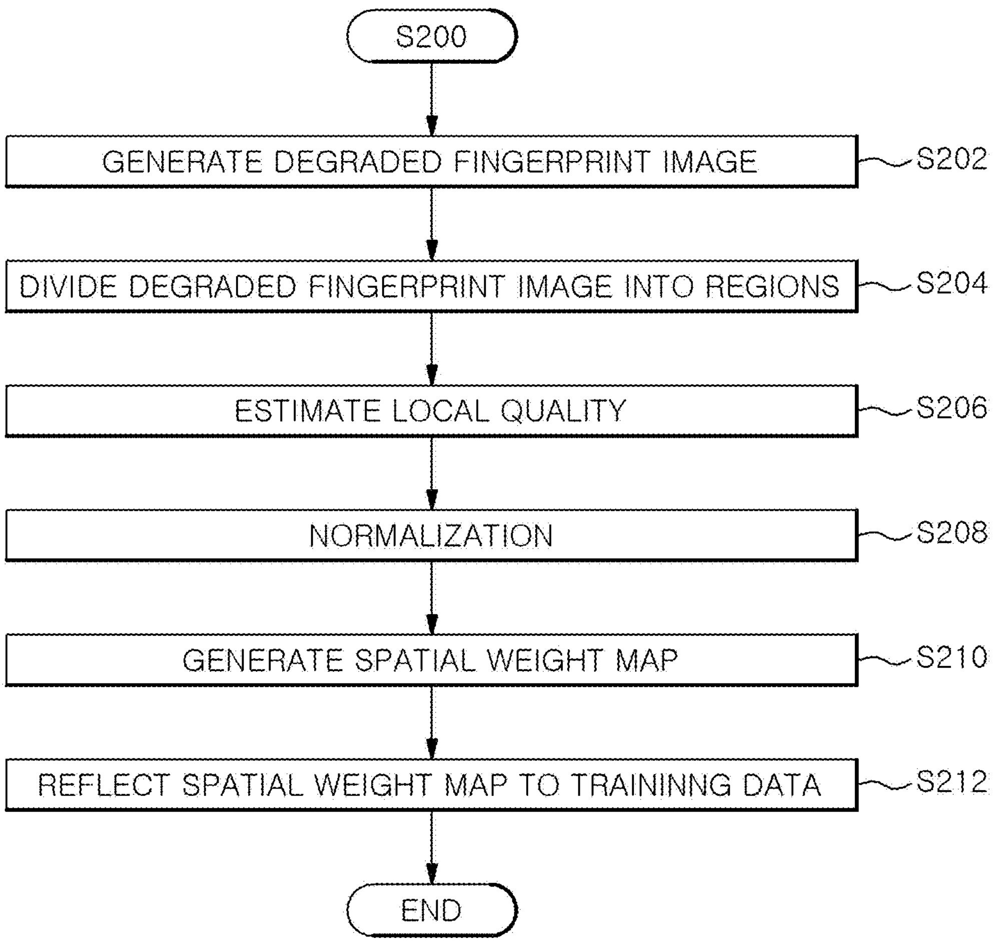
FIG. 4 is a flowchart specifically illustrating a process of generating training data in the training method of FIG. 3.
Figure 5:
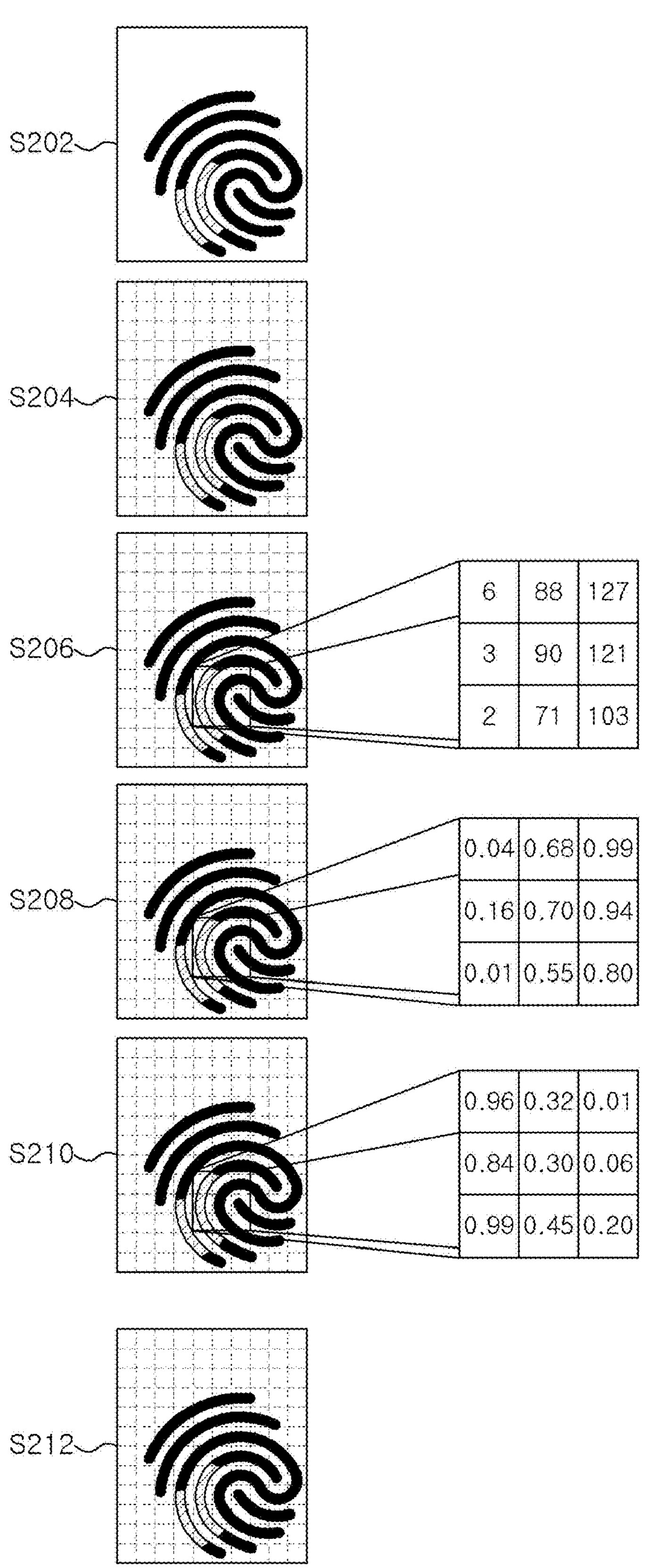
FIG. 5 shows diagrams for conceptually explaining the training data generation process in FIG. 4.

FIG. 4 is a flowchart specifically illustrating the training data generation process S200, i.e., the pre-processing procedure, in the training method of FIG. 3, and FIG. 5 shows diagrams for conceptually explaining the training data generation process S200.

As shown in FIGS. 4 and 5, the fingerprint recognition device 100 may generate a degraded fingerprint image a from the original fingerprint image A (S202). Various degradation techniques, such as Gaussian blur processing, noise injection, and resolution degradation, may be applied to generate the degraded fingerprint image a. In the embodiment of the present disclosure, any one of the degradation techniques may be applied, and at least one or more of the degradation techniques may be applied in a combined manner. In addition, in the embodiment of the present disclosure, the degradation techniques may be applied in a sequential manner or a random manner. However, the degradation technique applied in the embodiment of the present disclosure is not limited to any particular method.

Once the degraded fingerprint image a is generated, the fingerprint recognition device 100 may divide the corresponding degraded fingerprint image a into regions. In this case, the degraded fingerprint image a may be segmented into a grid structure of equal-sized blocks, for example, in M×N block units (S204).

Once the regions of the degraded fingerprint image a are segmented, the fingerprint recognition device 100 may estimate the local quality for each segmented region in the degraded fingerprint image a (S206). For example, the fingerprint recognition device 100 may estimate the local quality for each segmented region in the degraded fingerprint image a by calculating an indicator of the local quality based on ridge clarity and local contrast of the fingerprint for each M×N block unit.

Next, the fingerprint recognition device 100 may normalize the local quality indicator of each segmented region of the degraded fingerprint image a estimated in step S206 (S208). In this case, for example, the local quality indicator for each M×N block unit may be normalized to a range of 0 to 1.

Once the normalization process S208 is completed, the fingerprint recognition device 100 may generate a spatial weight map of the degraded fingerprint image a based on the normalized local quality estimation results (S210). For example, the fingerprint recognition device 100 may generate a spatial weight map such that regions with lower quality in the overall grid structure of the degraded fingerprint image a are assigned a higher correction strength to enable inverse transformation.

Once such a spatial weight map is generated, the fingerprint recognition device 100 may apply the spatial weight map to the training data (S212). For example, the fingerprint recognition device 100 may restore the degraded fingerprint image a to the size of the entire input image, and assign a spatial weight value to each block.

Figure 6:
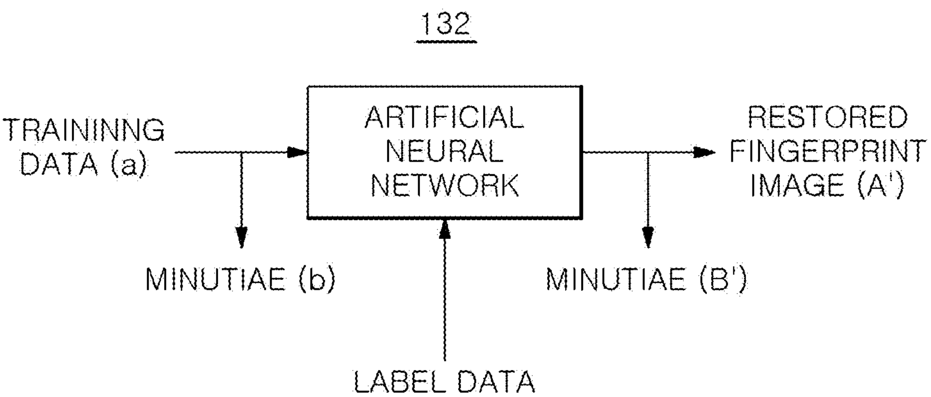
FIG. 6 is a block diagram for specifically explaining the process of training the artificial neural network in the training method of FIG. 3.
Figure 7:
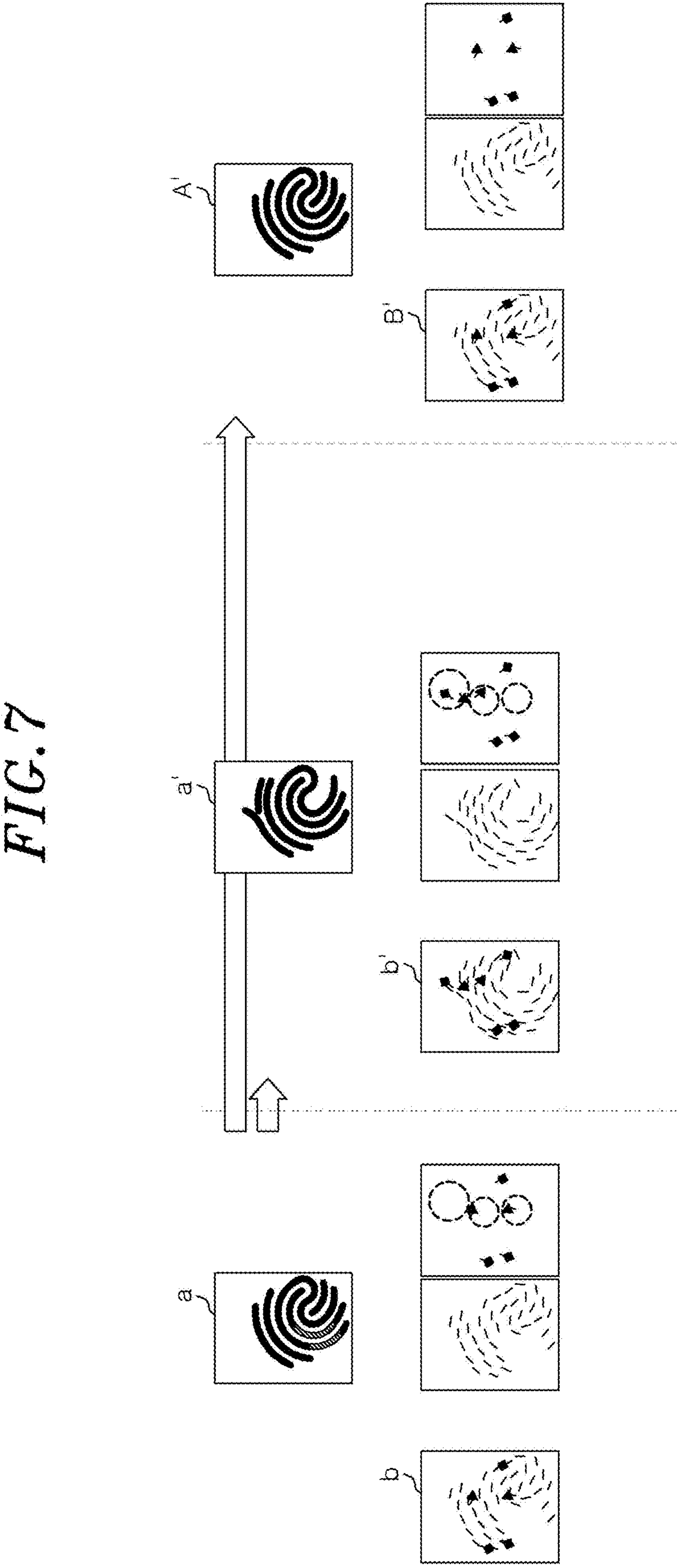
FIG. 7 shows diagrams for conceptually explaining the process of training the artificial neural network in FIG. 6.

FIG. 6 is a block diagram for exemplarily explaining the process of training the artificial neural network 132 in the training method of FIG. 3, and FIG. 7 shows diagrams for conceptually explaining the process of training the artificial neural network 132 in FIG. 6.

As shown in FIGS. 6 and 7, when training data including the degraded fingerprint image a is input to the artificial neural network 132, the processor 120 may set the original fingerprint image A as label data and train the artificial neural network 132 to generate a restored fingerprint image A' from the degraded fingerprint image a. The restored fingerprint image A' may have a resolution substantially identical to that of the original fingerprint image A.

In the embodiment of the present disclosure, the minutiae b in the degraded fingerprint image a and the minutiae B' in the restored fingerprint image A' are extracted, and the difference between the minutiae b extracted from the degraded fingerprint image a and the minutiae B' extracted from the restored fingerprint image A' is calculated, and the calculated difference is reflected in the loss function of the artificial neural network 132, thereby training the artificial neural network 132.

That is, unlike conventional fingerprint recognition devices that consider only differences (pixel-level loss or visual similarity) in fingerprint images, the present disclosure also considers differences between individual minutiae in the intentionally degraded fingerprint image and the fingerprint image obtained after the first-stage training of the artificial neural network 132, thereby not only improving fingerprint recognition performance through enhanced image quality but also sufficiently reflecting biometric feature variations of the fingerprint, which ensures high reliability of the fingerprint recognition device 100.

In this case, reflecting the minutiae b in the degraded fingerprint image a and the minutiae B' in the restored fingerprint image A' may include measuring the difference between the degraded fingerprint image a and the restored fingerprint image a' to which the first enhancement has been applied, and measuring the difference between the minutiae b in the degraded fingerprint image a and the minutiae b' in the restored fingerprint image a' to which the first enhancement has been applied, for example, the degree of change in at least one of the position, angle, and number of minutiae between the fingerprint images, and the measurement result may be reflected as feedback information (cost function) of the artificial neural network 132. In FIG. 7, the restored fingerprint image after the cost function has been reflected is denoted as A', and its minutiae are represented as B'.

That is, the present disclosure is characterized in that when the minutiae B' in the restored fingerprint image A' are significantly displaced or lost, the artificial neural network 132 is continuously and repeatedly trained to minimize such changes by increasing the cost function.

In the embodiment of the present disclosure, a final restored fingerprint image E(x,y) may be generated through blending between the restored fingerprint image A' enhanced through the artificial neural network 132 and the original fingerprint image A, and the restored fingerprint image E(x,y) finally output through the artificial neural network 132 through such iterative training process may be expressed by the following Equation 1.

$$E(x,y)=W(x,y)\cdot O(x,y)+(1-W(x,y))\cdot I(x,y) \quad \text{(Equation 1)}$$

In Equation 1, W(x,y) represents the spatial weight map, O(x,y) represents the restored fingerprint image A' generated by the artificial neural network 132, and I(x,y) represents the original fingerprint image A.

Figure 8:
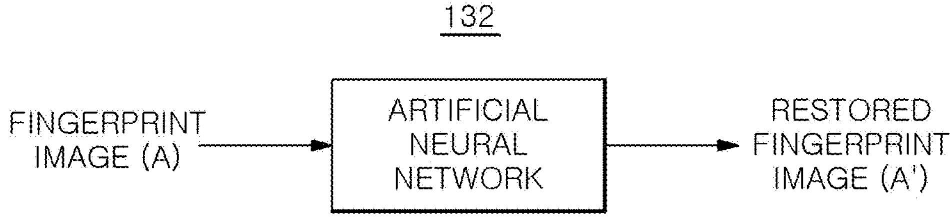
FIG. 8 is a block diagram for specifically explaining a process of restoring a fingerprint image using the artificial neural network trained in FIG. 6.

FIG. 8 is a block diagram for exemplarily explaining the process of restoring a fingerprint image using the artificial neural network 132 trained in FIG. 6.

As shown in FIG. 8, when an arbitrary fingerprint image A is input into the artificial neural network 132, the fingerprint recognition device 100 may output a restored fingerprint image A' having a resolution substantially identical to that of the corresponding fingerprint image A and minutiae B' substantially identical to the minutiae B in the corresponding fingerprint image A using the pre-trained artificial neural network 132.

In this case, the restored fingerprint image A' may be characterized by reflecting the minutiae b in the degraded fingerprint image a, which is obtained through degrading the input fingerprint image A, and the minutiae B' in the restored fingerprint image A'.

Meanwhile, the artificial neural network 132 in this specification may include, for example, at least one of a recurrent neural network (RNN), a long short-term memory (LSTM) network, a deep neural network (DNN), a convolutional neural network (CNN), and a bidirectional recurrent deep neural network (BRDNN), but is not limited thereto. In one embodiment, the artificial neural network 132 may be a model trained using a transfer learning method. Here, transfer learning refers to a learning method in which a pre-trained model for a first task is obtained through pre-training a large amount of unlabeled training data using semi-supervised or self-supervised learning, and the pre-trained model is then fine-tuned for a second task using labeled training data in a supervised learning manner to implement a target model.

According to the embodiment of the present disclosure, a low-quality fingerprint image can be restored to a high-quality fingerprint image, and the quality of the entire fingerprint image can be improved in a balanced manner by restoring low-quality regions in the fingerprint image to high quality while maintaining high-quality regions in their original state. In addition, according to the embodiment of the present disclosure, it is possible to obtain a restored fingerprint image in a way that enhances image quality while maintaining the biometric features of the original fingerprint image. As a result, the reliability of the fingerprint recognition device can be improved.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A fingerprint recognition device comprising:

an acquisition unit that acquires an original fingerprint image;

a memory including instructions for generating a restored fingerprint image from the original fingerprint image using a pre-trained artificial neural network, the restored fingerprint image having a resolution substantially identical to that of the original fingerprint image; and a processor for executing the instructions to generate the restored fingerprint image having the resolution substantially identical to that of the original fingerprint image and minutiae substantially identical to minutiae in the original fingerprint image, wherein the artificial neural network is pre-trained to generate the restored fingerprint image by reflecting minutiae in a degraded fingerprint image obtained through degrading the original fingerprint image and minutiae in the restored fingerprint image.

2. The fingerprint recognition device of claim 1, wherein the artificial neural network is pre-trained by reflecting a difference between the minutiae in the degraded fingerprint image and the minutiae in the restored fingerprint image in a loss function.

3. The fingerprint recognition device of claim 2, wherein the artificial neural network is pre-trained by reflecting a degree of change in at least one of position, angle, and a number of the minutiae between the degraded fingerprint image and the restored fingerprint image in the loss function.

4. The fingerprint recognition device of claim 1, wherein the artificial neural network is pre-trained to generate the restored fingerprint image by inputting the degraded fingerprint image or a pair of the original fingerprint image and the degraded fingerprint image as training data, and by setting the original fingerprint image as label data.

5. The fingerprint recognition device of claim 1, wherein the degraded fingerprint image includes an image obtained through applying a plurality of degradation techniques in a sequential or random manner, estimating a local quality of the degraded fingerprint image, and applying a spatial weight map based on a result of the local quality estimation.

6. The fingerprint recognition device of claim 5, wherein the local quality includes an indicator of the local quality based on ridge clarity and local contrast of the degraded fingerprint image segmented into block units.

7. The fingerprint recognition device of claim 6, wherein the spatial weight map is obtained through reflecting a result of normalizing the indicator.

8. The fingerprint recognition device of claim 5, wherein the restored fingerprint image is expressed by the following Equation:

$$E(x,y)=W(x,y)\cdot O(x,y)+(1-W(x,y))\cdot I(x,y)$$

where W(x,y) represents the spatial weight map, O(x,y) represents the restored fingerprint image, and I(x,y) represents the original fingerprint image.

9. A method for training an artificial neural network for fingerprint image restoration in a fingerprint recognition device, the method comprising:

acquiring an original fingerprint image;

generating training data including a degraded fingerprint image obtained through degrading the original fingerprint image; and training the artificial neural network to generate a restored fingerprint image from the training data, the restored fingerprint image having a resolution substantially identical to that of the original fingerprint image and minutiae substantially identical to minutiae in the original fingerprint image.

10. The method of claim 9, wherein the training the artificial neural network includes:

extracting minutiae in the degraded fingerprint image and the minutiae in the restored fingerprint image; and reflecting a difference between the minutiae in the degraded fingerprint image and the minutiae in the restored fingerprint image in a loss function of the artificial neural network.

11. The method of claim 10, wherein the reflecting the loss function of the artificial neural network includes:

measuring a degree of change in at least one of position, angle, and a number of the minutiae between the degraded fingerprint image and the restored fingerprint image.

12. The method of claim 9, wherein the training the artificial neural network includes:

training the artificial neural network to generate the restored fingerprint image by inputting the degraded fingerprint image or a pair of the original fingerprint image and the degraded fingerprint image as training data, and by setting the original fingerprint image as label data.

13. The method of claim 10, wherein the generating the training data includes:

generating the degraded fingerprint image by applying a plurality of degradation techniques to the original fingerprint image in a sequential or random manner;

estimating a local quality of the degraded fingerprint image; and generating a spatial weight map of the degraded fingerprint image based on a result of the local quality estimation.

14. The method of claim 13, wherein the estimating a local quality of the degraded fingerprint image includes:

calculating an indicator of the local quality based on ridge clarity and local contrast of the degraded fingerprint image segmented into block units.

15. The method of claim 14, wherein generating the spatial weight map includes:

normalizing the indicator.

16. The method of claim 13, wherein the training the artificial neural network includes repeatedly training the artificial neural network to minimize the difference between the minutiae in the degraded fingerprint image and the minutiae in the restored fingerprint image, the final restored fingerprint image output through the repeated training is expressed by the following Equation:

$$E(x,y)=W(x,y)\cdot O(x,y)+(1-W(x,y))\cdot I(x,y)$$

where W(x,y) represents the spatial weight map, O(x,y) represents the restored fingerprint image, and I(x,y) represents the original fingerprint image.

17. A non-transitory computer-readable storage medium storing a computer program including instructions for causing a processor to perform a fingerprint recognition method, the fingerprint recognition method comprising:

acquiring an original fingerprint image; and generating a restored fingerprint image using a pre-trained artificial neural network, the restored fingerprint image having a resolution substantially identical to that of the original fingerprint image and minutiae substantially identical to minutiae in the original fingerprint image, wherein the restored fingerprint image reflects minutiae in a degraded fingerprint image obtained through degrading the original fingerprint image and the minutiae in the restored fingerprint image.

18. The non-transitory computer-readable storage medium of claim 17, wherein the artificial neural network is pre-trained by reflecting a difference between the minutiae in the degraded fingerprint image and the minutiae in the restored fingerprint image in a loss function.

19. The non-transitory computer-readable storage medium of claim 18, wherein the artificial neural network is pre-trained by reflecting a degree of change in at least one of position, angle, and a number of the minutiae between the degraded fingerprint image and the restored fingerprint image in the loss function.

20. The non-transitory computer-readable storage medium of claim 17, wherein the artificial neural network is pre-trained to generate the restored fingerprint image by inputting the degraded fingerprint image or a pair of the original fingerprint image and the degraded fingerprint image as training data, and by setting the original fingerprint image as label data.

* * * * *